(12) United States Patent
Huang et al.

(10) Patent No.: US 9,225,543 B2
(45) Date of Patent: Dec. 29, 2015

(54) NETWORK INTERFACE CARD, NETWORK SYSTEM, AND METHOD FOR BUILDING NETWORK CONNECTIONS WITH A REMOTE NETWORK APPARATUS VIA HDMI

(75) Inventors: Liang-Wei Huang, Hsinchu (TW); Li-Han Liang, Taipei (TW); Chun-Hung Liu, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 653 days.

(21) Appl. No.: 13/340,689

(22) Filed: Dec. 30, 2011

(65) Prior Publication Data

US 2012/0173785 A1 Jul. 5, 2012

(30) Foreign Application Priority Data

Dec. 31, 2010 (TW) .................................. 99147203 A

(51) Int. Cl.
| | | |
|---|---|---|
| *G06F 13/00* | (2006.01) | |
| *H04L 12/28* | (2006.01) | |
| *H04L 12/46* | (2006.01) | |
| *H04N 5/932* | (2006.01) | |
| *H04N 7/18* | (2006.01) | |
| *H04L 29/08* | (2006.01) | |

(52) U.S. Cl.
CPC ........ *H04L 12/2832* (2013.01); *H04L 12/4625* (2013.01); *H04L 69/32* (2013.01); *H04L 69/323* (2013.01); *H04L 2012/2849* (2013.01)

(58) Field of Classification Search
USPC .......................................... 710/300; 386/201
See application file for complete search history.

(56) References Cited

U.S. PATENT DOCUMENTS

| | | | |
|---|---|---|---|
| 8,346,052 B2* | 1/2013 | Ichimura ....................... 386/201 |
| 8,472,351 B2* | 6/2013 | Bar-Niv et al. ................ 370/257 |
| 2005/0251561 A1* | 11/2005 | Hanes ............................ 709/217 |
| 2006/0233168 A1* | 10/2006 | Lewites et al. ................ 370/389 |
| 2007/0165997 A1* | 7/2007 | Suzuki et al. .................... 386/46 |
| 2010/0189104 A1 | 7/2010 | Ichimura |
| 2011/0153793 A1* | 6/2011 | Tan ................................ 709/222 |

FOREIGN PATENT DOCUMENTS

| | | |
|---|---|---|
| CN | 101296073 A | 10/2008 |
| CN | 101605233 A | 12/2009 |

OTHER PUBLICATIONS

HDMI Licensing LLC, High-Definition Multimedia Specification, Version 1.4, 2009.*

* cited by examiner

*Primary Examiner* — Tim T Vo
*Assistant Examiner* — Christopher A Daley
(74) *Attorney, Agent, or Firm* — Winston Hsu; Scott Margo

(57) ABSTRACT

A network interface card includes a receiving unit and a capturing unit. The receiving unit is used for receiving a first hot-plug signal transmitted from a remote network apparatus via an HDMI. The capturing unit is coupled to the receiving unit, for capturing a physical address of the remote network apparatus via the HDMI. After the physical address of the remote network apparatus is captured by the capturing unit, the network interface card communicates with the remote network apparatus by using the HDMI.

17 Claims, 6 Drawing Sheets

NETWORK INTERFACE CARD, NETWORK SYSTEM, AND METHOD FOR BUILDING NETWORK CONNECTIONS WITH A REMOTE NETWORK APPARATUS VIA HDMI

BACKGROUND OF THE INVENTION

1. Field of the Invention

The present disclosure relates to a network interface card and a network apparatus having the network interface card, and more particularly, to a network interface card, a network system, and a method for building network connections with a remote network apparatus via HDMI.

2. Description of the Prior Art

Currently, High-Definition Multimedia Interface version 1.4 (HDMI 1.4) supports the function of HDMI Ethernet Channel and Audio Return Channel (HEAC), such that both data compliant with the 100Base-TX IEEE802.3 standard and audio data compliant with the IEC60958-1 format can be delivered through the latest HDMI simultaneously. Therefore, complex home network wiring can be simplified to provide a single high bandwidth and high-quality wiring in order to transfer complete images, audio, and Ethernet transports, and achieve integration of multimedia networking applications.

For this reason, if the function of HDMI Ethernet Channel (HEC) and Audio Return Channel (ARC) can be enabled in a network apparatus originally supporting HDMI 1.3, the network apparatus can be upgraded to possess the HEAC function and support HDMI 1.4.

Hence, how to enable the function of HDMI Ethernet Channel and Audio Return Channel (HEAC) in order to allow the network device to support HDMI 1.4 has become an important issue to be solved.

SUMMARY OF THE INVENTION

It is therefore one of the objectives of the present disclosure to provide a network interface card, a network system, and a method for building network connections with a remote network apparatus via HDMI, such that the function of HDMI Ethernet Channel and Audio Return Channel (HEAC) can be enabled in order to solve the above-mentioned problems of the prior art.

According to one aspect of the present disclosure, an exemplary network interface card is provided. The network interface card may include a receiving unit and a capturing unit. The receiving unit is arranged for receiving a first hot-plug signal transmitted from a remote network apparatus via a High Definition Multimedia Interface (HDMI). The capturing unit is coupled to the receiving unit, and is arranged for capturing a physical address of the remote network apparatus via the HDMI. After the physical address of the remote network apparatus is captured by the capturing unit, the network interface card communicates with the remote network apparatus by using the HDMI.

According to another aspect of the present disclosure, an exemplary network system for building network connections with a remote network apparatus via High Definition Multimedia Interface (HDMI) is provided. The network system may include a network interface card and a HDMI card. The network interface card is arranged for building the network connections with the remote network apparatus. The network interface card may include a first receiving unit and a capturing unit. The first receiving unit is arranged for receiving a first hot-plug signal transmitted from the remote network apparatus via the HDMI. The capturing unit is coupled to the first receiving unit, and is arranged for capturing a physical address of the remote network apparatus via the HDMI, wherein after the physical address of the remote network apparatus is captured by the capturing unit, the network interface card communicates with the remote network apparatus by using the HDMI. The HDMI card is coupled to the network interface card. The HDMI card may include a second receiving unit and a control unit. The second receiving unit is arranged for receiving a second hot-plug signal from the first receiving unit. The control unit is coupled to the second receiving unit, and is arranged for controlling the network connections with the remote network apparatus via the HDMI.

According to another aspect of the present disclosure, an exemplary network connecting method applied to a network system is provided. The network system may include a network interface card and an HDMI card, for building network connections with a remote network apparatus via High Definition Multimedia Interface (HDMI). The method includes the following steps: receiving a first hot-plug signal transmitted from the remote network apparatus via the HDMI; capturing a physical address of the remote network apparatus via the HDMI, wherein after the physical address of the remote network apparatus is captured, the network interface card communicates with the remote network apparatus by using the HDMI; receiving a second hot-plug signal; and controlling the network connections with the remote network apparatus via the HDMI.

According to another aspect of the present disclosure, an exemplary network connecting method applied to a network interface card is provided. The method includes the following steps: receiving a first hot-plug signal transmitted from a remote network apparatus via High Definition Multimedia Interface (HDMI); capturing a physical address of the remote network apparatus via the HDMI; and after the physical address of the remote network apparatus is captured, communicating with the remote network apparatus by using the HDMI.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
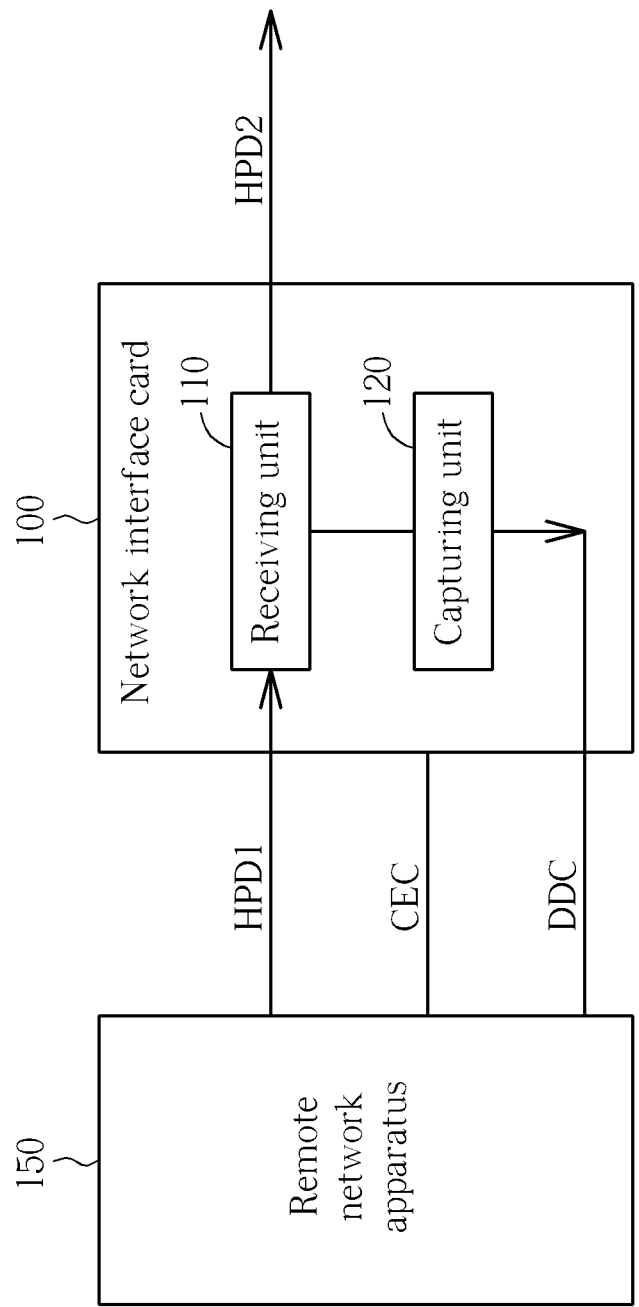
FIG. 1 is a block diagram of a network interface card according to an embodiment of the present disclosure.

Please refer to FIG. 1. FIG. 1 is a block diagram of a network interface card 100 according to an embodiment of the present disclosure. As shown in FIG. 1, the network interface card 100 may include, but is not limited to, a receiving unit 110 and a capturing unit 120. The receiving unit 110 is arranged for receiving a first hot-plug signal HPD1 transmitted from a remote network apparatus 150 via a High Definition Multimedia Interface (HDMI). The capturing unit 120 is coupled to the receiving unit 110, and is arranged for capturing a physical address PA of the remote network apparatus 150 via the HDMI. For example, after the HDMI is plugged into the remote network apparatus 150, the remote network apparatus 150 will send out the first hot-plug signal HPD1. The network interface card 100 can then be set as master of a master/slave architecture for capturing the physical address PA of the remote network apparatus 150. What calls for special attention is that: after the physical address PA of the remote network apparatus 150 is captured by the capturing unit 120, the network interface card 100 communicates with the remote network apparatus 150 by using the HDMI. For example, the function of HDMI Ethernet Channel (HEC) and Audio Return Channel (ARC) can be enabled by using a consumer electronics control (ECE) of the HDMI. In addition, the network interface card can support a wake on LAN function by using a consumer electronics control (ECE) command.

Figure 2:
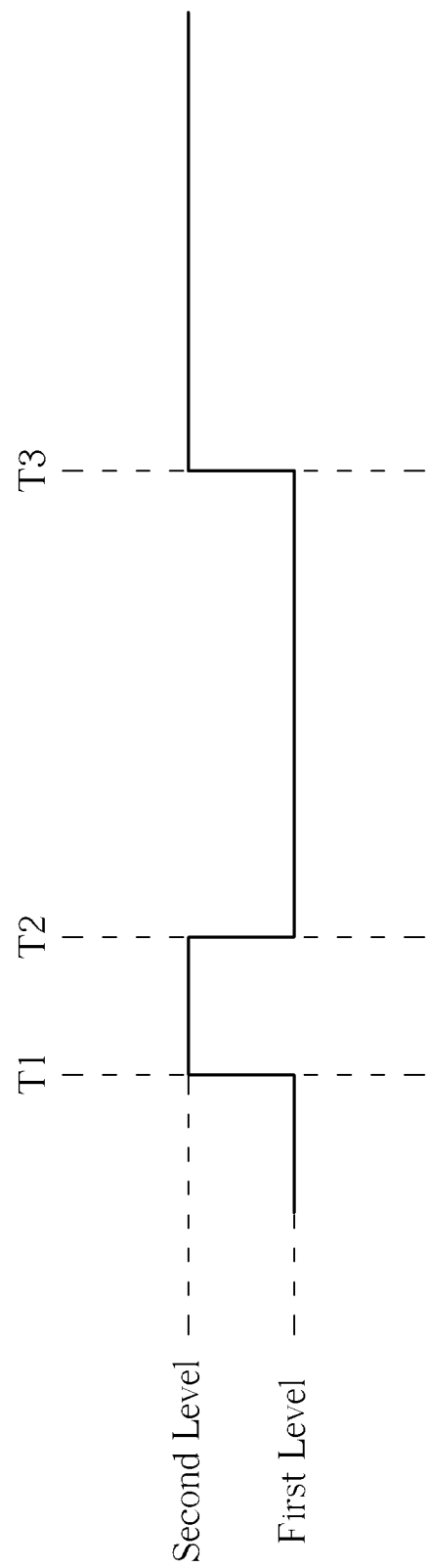
FIG. 2 is a diagram illustrating how the receiving unit shown in FIG. 1 generates a second hot-plug signal according to a first hot-plug signal according to an embodiment of the present disclosure.

What calls for special attention is that: after the physical address PA of the remote network apparatus 150 is captured by the capturing unit 120, the receiving unit 110 is further arranged for generating a second hot-plug signal HPD2 according to the first hot-plug signal HPD1. This is shown in FIG. 2, which is a diagram illustrating how the receiving unit 110 shown in FIG. 1 generates a second hot-plug signal HPD2 according to the first hot-plug signal HPD1 according to an embodiment of the present disclosure. At timing T1, the first hot-plug signal HPD1 is transformed from a first level to a second level, and the receiving unit 110 controls the first hot-plug signal HPD1 to be transformed from the second level to the first level until the physical address PA of the remote network apparatus 150 is captured by the capturing unit 120 (i.e. at timing T3); and then the receiving unit 110 controls the first hot-plug signal HPD1 to be transformed from the first level to the second level in order to generate the second hot-plug signal HPD2.

Figure 3:
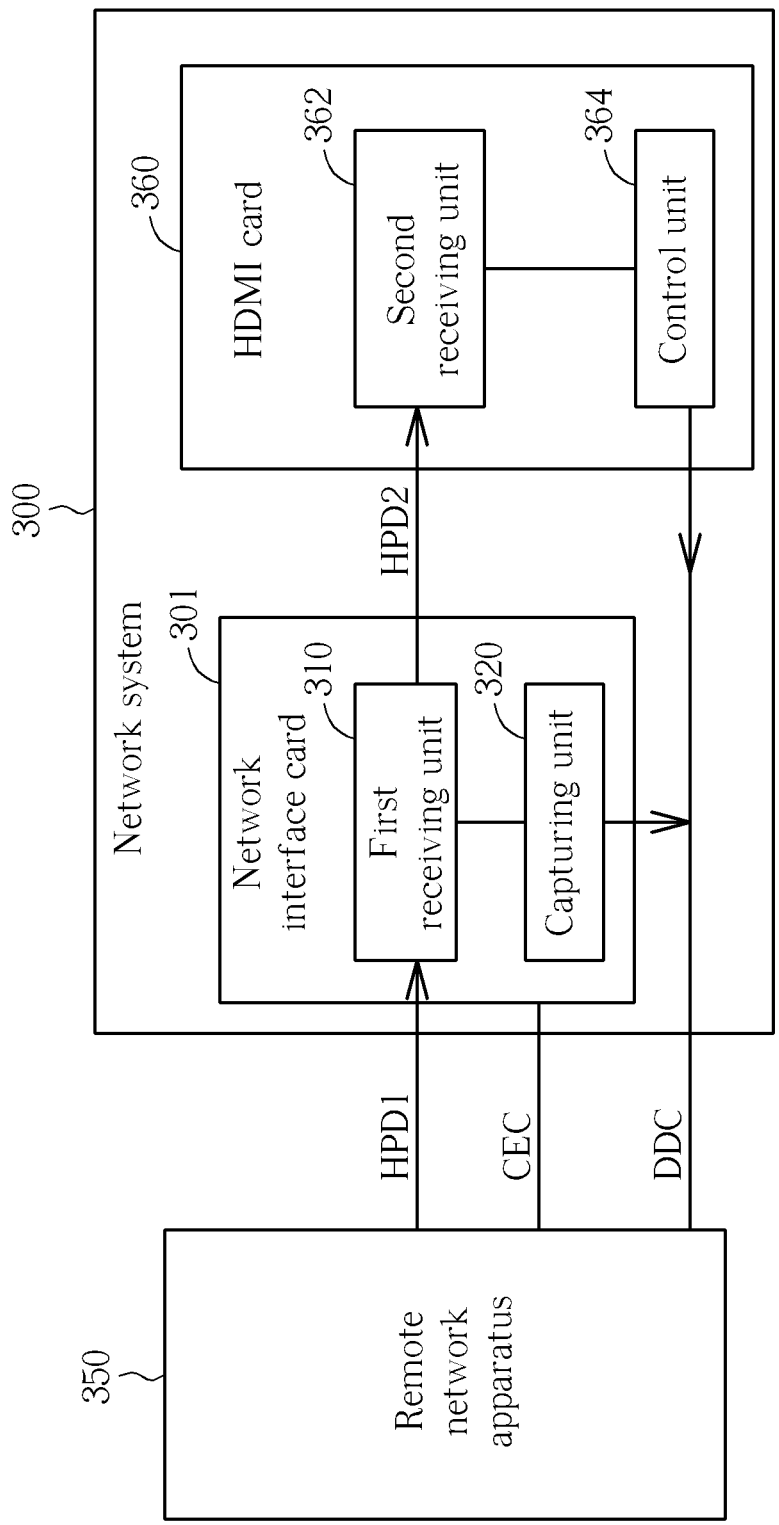
FIG. 3 is a diagram illustrating a network system for building network connections with a remote network apparatus via HDMI according to a first embodiment of the present disclosure.

Please refer to FIG. 3. FIG. 3 is a diagram illustrating a network system 300 for building network connections with a remote network apparatus 350 via HDMI according to a first embodiment of the present disclosure. In one embodiment, the remote network apparatus 350 can be implemented by a television, and the network system 300 can be implemented by a notebook computer, but the present disclosure is not limited to this only. As shown in FIG. 3, the network system 300 may include, but is not limited to, a network interface card 301 and an HDMI card 360. The network interface card 301 is arranged for building network connections with a remote network apparatus 350, which has an architecture and operating principles similar to that of the network interface card 100 shown in FIG. 1; further description is therefore omitted here for brevity. What calls for special attention is that: the HDMI card 360 may include a second receiving unit 362 and a control unit 364. After the physical address PA of the remote network apparatus 350 is captured by the capturing unit 120, the second receiving unit 362 may receive a second hot-plug signal HPD2 from the first receiving unit 310. The control unit 364 is coupled to the second receiving unit 362. After the second hot-plug signal HPD2 is received by the second receiving unit 362, the control unit 364 can be set as master of a master/slave architecture for controlling the network connections with the remote network apparatus 350 via the HDMI of the remote network apparatus 350. Therefore, the problem of co-occurrence of two masters can be avoided.

Furthermore, in this embodiment, the network interface card 301 and the HDMI card 360 are implemented by a separate structure. Hence, the network interface card 301 can support a wake on LAN function by using a consumer electronics control (ECE) command.

Figure 4:
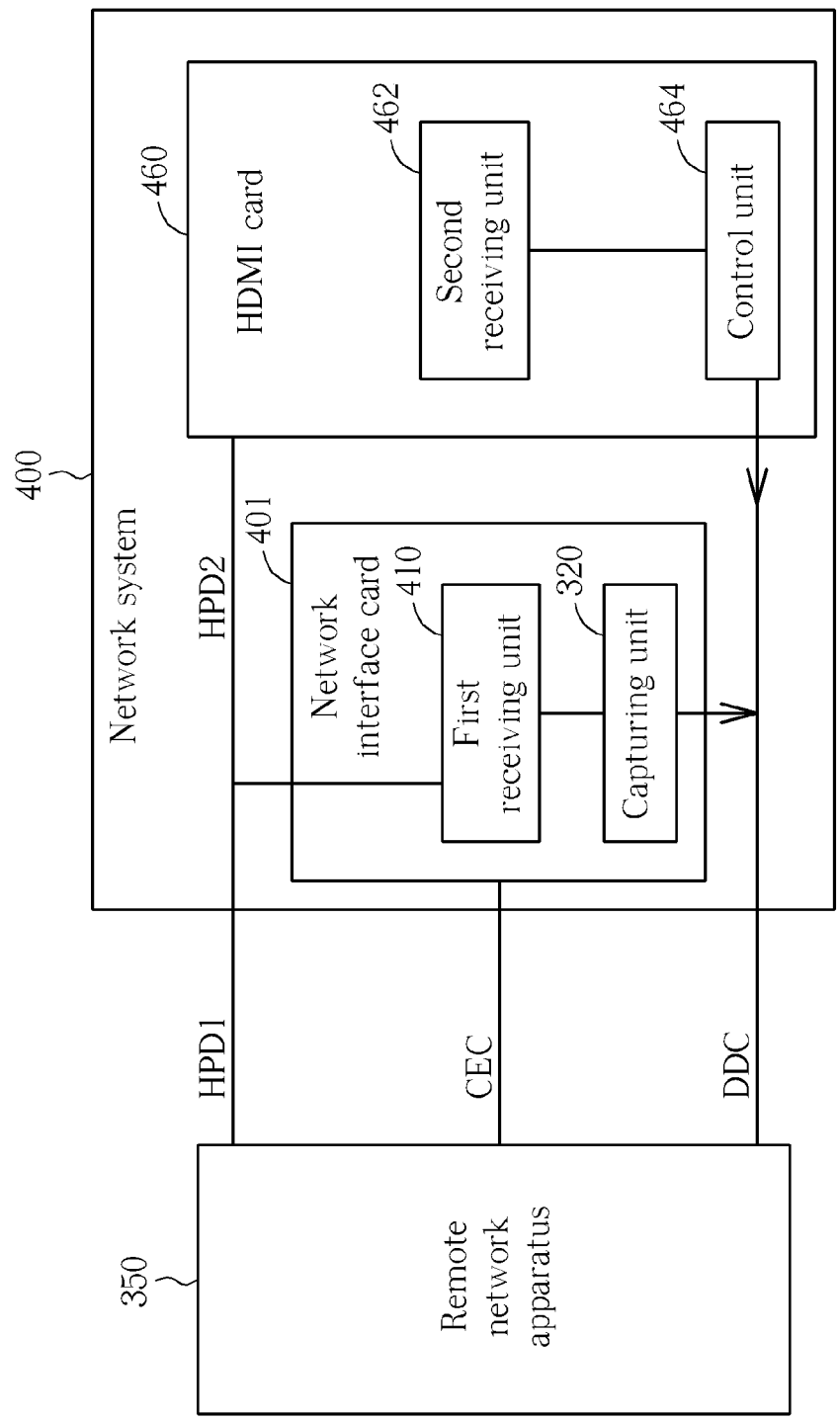
FIG. 4 is a diagram illustrating a network system for building network connections with a remote network apparatus via HDMI according to a second embodiment of the present disclosure.

Please refer to FIG. 4. FIG. 4 is a diagram illustrating a network system 400 for building network connections with a remote network apparatus 350 via HDMI according to a second embodiment of the present disclosure. The architecture of the network system 400 shown in FIG. 4 is similar to that of the network system 300 shown in FIG. 3, where the difference between them is that: the network system 400 is directly coupled to the remote network apparatus 350. Therefore, even if the network interface card 401 is broken, the HDMI card 460 can still work normally.

Moreover, in this embodiment, the second hot-plug signal HPD2 can be generated according to the first hot-plug signal HPD1. The operating principles of how the first receiving unit 410 generates the second hot-plug signal HPD2 according to the first hot-plug signal HPD1 are similar to that of the receiving unit 110. As those skilled in the art can easily understand how the first receiving unit 410 generates the second hot-plug signal HPD2 according to the first hot-plug signal HPD1 by reference to the descriptions of the receiving unit 110 mentioned above, further description is omitted here for brevity.

Figure 5:
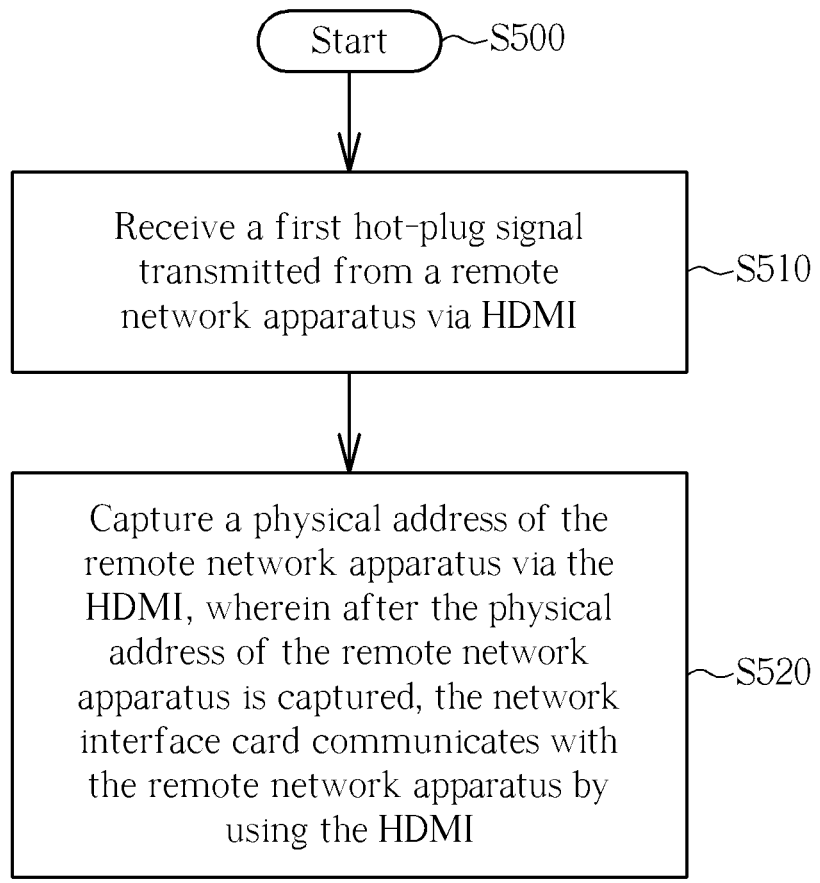
FIG. 5 is a flowchart illustrating a method for building network connections applied to a network system according to an exemplary embodiment of the present disclosure.

Please refer to FIG. 5. FIG. 5 is a flowchart illustrating a method for building network connections applied to a network system according to an exemplary embodiment of the present disclosure. Please note that the following steps are not limited to be performed according to the exact sequence shown in FIG. 5 if a roughly identical result can be obtained. The method may include, but is not limited to, the following steps:

Step S500: Start.

Step S510: Receive a first hot-plug signal transmitted from a remote network apparatus via HDMI.

Step S520: Capture a physical address of the remote network apparatus via the HDMI, wherein after the physical address of the remote network apparatus is captured, the network interface card communicates with the remote network apparatus by using the HDMI.

Those skilled in the art can readily understand how each element operates by combining the steps shown in FIG. 5 and the elements shown in FIG. 1, and further description is therefore omitted here for brevity. Please note that the steps S510 and S520 are executed by the network interface card 100.

Figure 6:
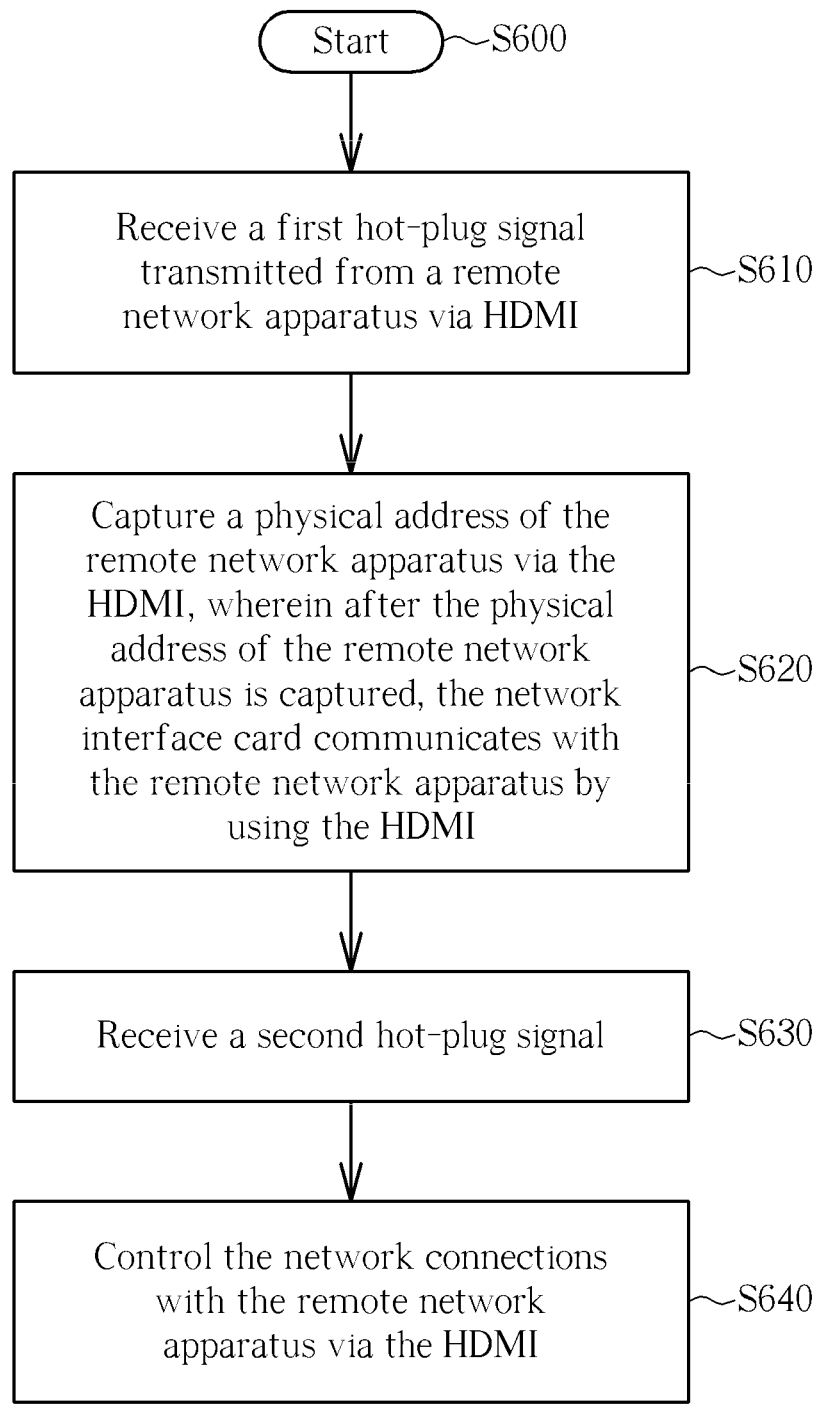
FIG. 6 is a flowchart illustrating a method for building network connections applied to a network system according to another exemplary embodiment of the present disclosure.

Please refer to FIG. 6. FIG. 6 is a flowchart illustrating a method for building network connections applied to a network system according to another exemplary embodiment of the present disclosure. Please note that the following steps are not limited to be performed according to the exact sequence shown in FIG. 6 if a roughly identical result can be obtained. The method may include, but is not limited to, the following steps:

Step S600: Start.

Step S610: Receive a first hot-plug signal transmitted from a remote network apparatus via HDMI.

Step S620: Capture a physical address of the remote network apparatus via the HDMI, wherein after the physical address of the remote network apparatus is captured, the network interface card communicates with the remote network apparatus by using the HDMI.

Step S630: Receive a second hot-plug signal.

Step S640: Control the network connections with the remote network apparatus via the HDMI.

Those skilled in the art can readily understand how each element operates by combining the steps shown in FIG. 6 and the elements shown in FIG. 3 and FIG. 4, and further description is therefore omitted here for brevity. Please note that the steps S610 and S620 are executed by the network interface card 301; and the steps S630 and S640 are executed by the HDMI card 360.

Please note that the steps of the abovementioned flowcharts are merely practicable embodiments of the present disclosure, and in no way should be considered to be limitations of the scope of the present disclosure. These methods can include other intermediate steps or several steps can be merged into a single step without departing from the spirit of the present disclosure.

The abovementioned embodiments are presented merely to illustrate technical features of the present disclosure, and in no way should be considered to be limitations of the scope of the present disclosure. In summary, a network interface card, a network system, and a method for building network connections with a remote network apparatus via HDMI are provided in the present disclosure, such that the function of HDMI Ethernet Channel and Audio Return Channel (HEAC) can be enabled and the network apparatus can be upgraded to support HDMI 1.4. In addition, even if the network interface card is broken, the HDMI card 460 can still work alone. The network interface card and the HDMI card disclosed in the present disclosure are implemented by a separate structure, and thus the network interface card can support a wake on LAN function.

Those skilled in the art will readily observe that numerous modifications and alterations of the device and method may be made while retaining the teachings of the invention.

What is claimed is:

1. A network interface card utilized as a front-end device prior to a High Definition Multimedia Interface (HDMI) card, comprising:
   a receiving unit, for receiving a first hot-plug signal transmitted from a remote network apparatus via an HDMI, and generating a second hot-plug signal according to the first hot-plug signal; and
   a capturing unit, coupled to the receiving unit, for capturing a physical address of the remote network apparatus via the HDMI;
   wherein after the physical address of the remote network apparatus is captured by the capturing unit, the network interface card communicates with the remote network apparatus by using the HDMI, and the receiving unit prevents a transformation of the second hot-plug signal until the physical address of the remote network apparatus is captured.

2. The network interface card according to claim 1, wherein when the first hot-plug signal is transformed from a first level to a second level, the receiving unit controls the first hot-plug signal to be transformed from the second level to the first level until the physical address of the remote network apparatus is captured by the capturing unit; and then the receiving unit controls the first hot-plug signal to be transformed from the first level to the second level in order to generate the second hot-plug signal.

3. The network interface card according to claim 1, wherein the network interface card supports a wake on LAN function by using a consumer electronics control (ECE) command.

4. The network interface card according to claim 1, wherein the network interface card is set as a master of a master/slave architecture for capturing the physical address of the remote network apparatus.

5. The network interface card according to claim 1, wherein the capturing unit captures the physical address of the remote network apparatus via a display data channel (DDC).

6. A network system, for building network connections with a remote network apparatus via High Definition Multimedia Interface (HDMI), the network system comprising:
   a network interface card, for building the network connections with the remote network apparatus, the network interface card comprising:
      a first receiving unit, for receiving a first hot-plug signal transmitted from the remote network apparatus via the HDMI, and generating a second hot-plug signal according to the first hot-plug signal; and
      a capturing unit, coupled to the first receiving unit, for capturing a physical address of the remote network apparatus via the HDMI;
      wherein after the physical address of the remote network apparatus is captured by the capturing unit, the network interface card communicates with the remote network apparatus by using the HDMI, and the first receiving unit prevents a transformation of the second hot-plug signal until the physical address of the remote network apparatus is captured; and
   an HDMI card, coupled to the network interface card, the HDMI card comprising:
      a second receiving unit, for receiving a second hot-plug signal from the first receiving unit; and
      a control unit, coupled to the second receiving unit, for controlling the network connections with the remote network apparatus via the HDMI;
   wherein the network interface card is utilized as a front-end device prior to the HDMI card.

7. The network system according to claim 6, wherein when the first hot-plug signal is transformed from a first level to a second level, the first receiving unit controls the first hot-plug signal to be transformed from the second level to the first level until the physical address of the remote network apparatus is captured by the capturing unit; and then the first receiving unit controls the first hot-plug signal to be transformed from the first level to the second level in order to generate the second hot-plug signal.

8. The network system according to claim 6, wherein the network interface card supports a wake on LAN function by using a consumer electronics control (ECE) command.

9. The network system according to claim 6, wherein the network interface card is set as a master of a master/slave architecture for capturing the physical address of the remote network apparatus.

10. The network system according to claim 6, wherein the capturing unit captures the physical address of the remote network apparatus via a display data channel (DDC).

11. A network connecting method applied to a network system, the network system comprising a network interface card and an HDMI card, the network interface card being a front-end device prior to the HDMI card, the method for building network connections with a remote network apparatus via High Definition Multimedia Interface (HDMI), and comprising:
- utilizing the network interface card for receiving a first hot-plug signal transmitted from the remote network apparatus via the HDMI;
- generating a second hot-plug signal according to the first hot-plug signal;
- utilizing the network interface card for capturing a physical address of the remote network apparatus via the HDMI, wherein after the physical address of the remote network apparatus is captured, the network interface card communicates with the remote network apparatus by using the HDMI;
- preventing a transformation of the second hot-plug signal until the physical address of the remote network apparatus is captured;
- utilizing the HDMI card for receiving the second hot-plug signal; and
- utilizing the HDMI card for controlling the network connections with the remote network apparatus via the HDMI.

12. The method according to claim 11, wherein the step of generating the second hot-plug signal according to the first hot-plug signal comprises:
- when the first hot-plug signal is transformed from a first level to a second level, controlling the first hot-plug signal to be transformed from the second level to the first level until the physical address of the remote network apparatus is captured; and then controlling the first hot-plug signal to be transformed from the first level to the second level in order to generate the second hot-plug signal.

13. The method according to claim 11, further comprising:
- supporting a wake on LAN function by using a consumer electronics control (ECE) command.

14. The method according to claim 11, wherein the network interface card is set as a master of a master/slave architecture for capturing the physical address of the remote network apparatus.

15. The method according to claim 11, wherein the step of capturing the physical address of the remote network apparatus via the HDMI further comprises:
- capturing the physical address of the remote network apparatus via a display data channel (DDC).

16. A network connecting method applied to a network interface card that is utilized as a front-end device prior to an HDMI card, comprising:
- receiving a first hot-plug signal transmitted from a remote network apparatus via High Definition Multimedia Interface (HDMI);
- generating a second hot-plug signal according to the first hot-plug signal;
- capturing a physical address of the remote network apparatus via the HDMI;
- preventing a transformation of the second hot-plug signal until the physical address of the remote network apparatus is captured;
- after the physical address of the remote network apparatus is captured, communicating with the remote network apparatus by using the HDMI.

17. The method according to claim 16, further comprising:
- supporting a wake on LAN function by using a consumer electronics control (ECE) command.

* * * * *